United States Patent Office 3,539,669
Patented Nov. 10, 1970

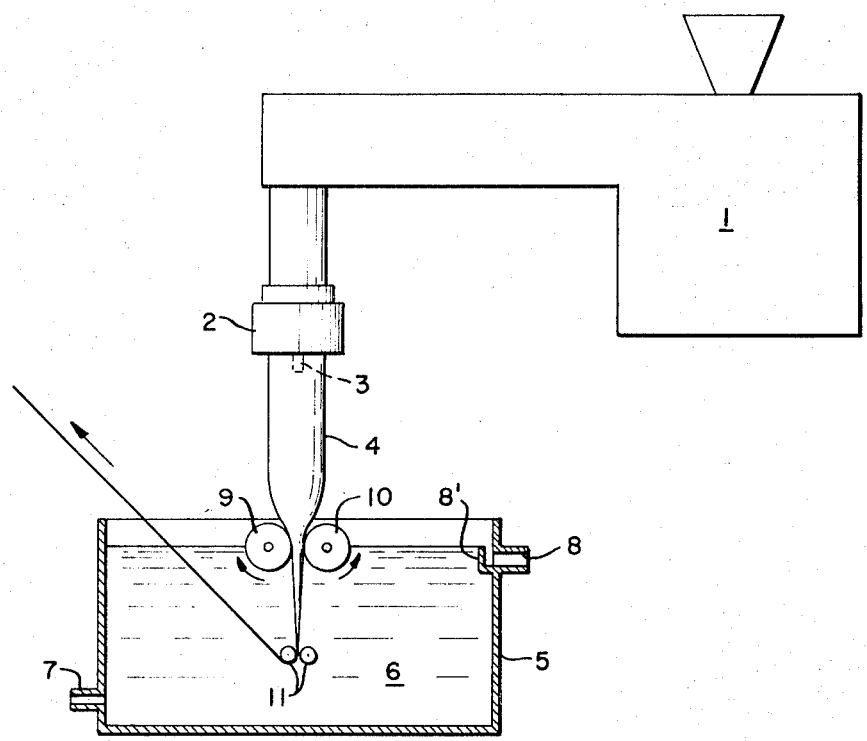

3,539,669
METHOD AND APPARATUS FOR MANUFACTURE OF HIGH CLARITY POLYOLEFIN FILM
Wu Chein-Ho, Causeway Bay, Hong Kong, assignor to Shell Oil Company, New York, N.Y., a corporation of Delaware
Filed Mar. 5, 1968, Ser. No. 710,566
Int. Cl. B29c 17/00, 25/00
U.S. Cl. 264—95        5 Claims

ABSTRACT OF THE DISCLOSURE

In the production of "lay-flat" polyolefin film by downward extrusion of inflated tubular film into a liquid cooling bath, film of improved clarity and freedom from surface defects is produced by passing the extruded, inflated tubular film between a pair of parallel, spaced-apart chilling rollers disposed at the surface of the cooling bath for rotation partly immersed therein, such that the chilling rollers support and partially collapse, but do not nip, the film as it enters the cooling bath. The film is thereafter completely collapsed to lay-flat form by nipping rollers within the cooling bath.

---

The present invention is concerned with the manufacture of polyolefin film by continuously extruding a polyolefin, for example, polypropylene in the molten state through a die having an annular extrusion orifice and continuously inflating the tubing so extruded, before it has cooled to the solid state, by means of a volume of gaseous inflating medium introduced into said tubing and, after cooling, collapsing the inflated tubing to the so-called "lay-flat" form in which it can be slit edgewise to form the required polyolefin film in sheet form. The present invention is also concerned with the resulting polyolefin film.

Clarity is becoming an increasingly important requirement for polyolefin film for use in packaging applications and it has been found that, in the case of polypropylene at least, it is necessary to achieve a rapid cooling of the inflated tubing in order to meet present day requirements in respect of clarity. The use of water as a cooling medium enables one to achieve the required cooling, but its use is not without practical difficulties. Taking, for example, the simplest form of water cooling in which the inflated tubing is drawn downwards from the extruder into a body of cooling water by a pair of nipping rollers disposed within the body of water, it has been found that the hydrostatic pressure exerted on that portion of the inflated tubing which lies below the water surface causes the tubing to collapse inwardly as it enters the water, with consequential wrinkling of its surface and also adhesion between contacting portions of the tubing surface due to the fact that such collapse occurs before the film has cooled to below the temperature at which it is still tacky. Such hydrostatic pressure not only tends to collapse the inflated tubing in an irregular manner before it reaches the submerged nipping rollers, but it has been found that such irregular collapse starts to take place as soon as the tubing enters the water and that wrinkling is not prevented by moving the nipping rollers nearer the surface of the cooling water. Moreover, the nearer the nipping rolls are brought to the water surface, the more the rotation of the nipping rolls disturbs the water surface; such disturbances give rise to surface defects in the tubular film (which is still in a heat-softened condition as it enters the water) which adversely affects the optical properties of the resulting film. It is not possible, of course, to increase the pressure of the gaseous inflating medium within the tubing to counteract this hydrostatic pressure since this would cause bursting of the tubing in the air space between the extruder and the water surface. Although other ways of utilizing water to effect rapid cooling of the inflated tubing have been proposed in the art, these are more complicated than the simple expedient of utilizing a body of cooling water and, providing the above difficulty can be overcome, the latter method is to be preferred on a manufacturing scale.

It has now been found that the above-mentioned difficulty can be overcome and rapid cooling of inflated polyolefin tubing to give film of good clarity when employing a body of cooling liquid may be effected by providing a pair of spaced-apart chilling rolls which both support and chill the inflated tubing as it enters the body of cooling liquid.

According to the present invention, a process for the manufacture of a polyolefin film is provided in which an extruded, internally blown tubular film is drawn downwards from an extruder into a body of cooling liquid within which said tubular film is fully collapsed to "lay-flat" form, wherein said tubular film is incompletely collapsed to "lay-flat" form by passage between a pair of parallel, spaced-apart, chilling rollers disposed at the surface of said body of cooling liquid for rotation partly immersed therein in positions such that said chilling rollers support, but do not nip, the film as it enters said body of cooling liquid.

Preferably said chilling rollers, which provide an initial rapid chilling of said tubular film, are disposed with their axes of rotation lying substantially within the plane containing the surface of said body of cooling liquid, but some latitude in the disposition of the chilling rollers with respect to said surface is permissible provided that the opposed "lay-flat" surfaces of the film are fully supported thereby as the film enters said body of cooling liqud.

The gap between said chilling rollers is such that the tubular film is substantially, but not completely, collapsed by passage between the rollers. The important aspect here is that contact between the opposing inside surfaces is avoided, since at this stage of the process they would tend to be damaged by such contact, and might even be caused to adhere to each other. The partially collapsed film is fully collapsed to "lay-flat" form by means, for example, of nipping rollers disposed wholly within said body of cooling liquid; such nipping rollers also function to trap the gaseous inflating medium within the tubular film. The vertical distance between the annular extrusion orifice of the die and the surface of the body of cooling liquid can be optimized by trial; for polypropylene film manufacture this distance will usually be between 6 and 20 inches, for example, between 11 and 15 inches. The diameter of the chilling rollers will normally be chosen so as to provide adequate support for the maximum film width contemplated; such chilling rollers will then be suitable for use in the manufacture of narrower films. In general, chilling rollers ten inches in diameter will be suitable for the manufacture of polypropylene films of the widths currently produced in the art.

The present invention alos includes machinery for the manufacture of polyolefin film, which comprises in combination an extruder capable of extruding in a downward direction an internally-blown tubular film of molten polyolefin, and film cooling apparatus comprising a container for cooling liquid, means for drawing said tubular film into a body of liquid in said container and a pair of parallel, spaced-apart chilling rollers adapted to support, but not to nip, said tubular film as it enters said body of cooling liquid.

Preferably said cooling liquid is water; and, in order to maintain an even film of cooling water on said cooling rollers to avoid causing surface imperfections in the polyolefin tubular film, the body of cooling water preferably contains a surface active agent, for example, an anionic surface active agent such as a commerecial secondary alkyl sulfonate detergent, in an amount sufficient to ensure the formation of an even water film on the surface of each chilling roller. Alternatively the formation of surface imperfections in the polyolefin tubular film can be avoided by removing adherent water from each chilling roller prior to its contacting the polyolefin film, for example, by means of a doctor blade.

The body of cooling water is preferably maintained at a temperature which is at least 50° C. below the softening point of the polyolefin being processed. Advantageously the cooling water is maintained at a temperature within the range from 10 to 20° C.

The process of this invention is particularly applicable to polypropylene film manufacture in which high clarity in packaging applications of polypropylene film is becoming increasingly important.

The present invention will now be further described and illustrated with reference to the accompanying drawing which in the sole figure shows in schematic cross-section machinery in which a tubular polyolefin film is drawn downwards from an extrusion die and through a cooling water bath by means of a pair of nipping rollers disposed within the water bath.

Referring to the drawing, an extruder 1 comprises a vertical extrusion die 2 having an annular extrusion orifice and an air passage 3 through which air for inflating the extruded tubing 4 can be supplied. Below the die 2 is a tank 5 which, in operation of the machinery, contains a body of water 6, the tank 5 being provided with a water inlet 7 and a water outlet 8 embodying a weir 8' which is conveniently adjustable to enable minor changes to be made in the water level in the tank 5. In this way the body of water in tank 5 can be maintained at a constant temperature. Mounted for rotation in the upper part of tank 5 are two parallel, chromium-plated, driven chilling rollers 9 and 10. The chilling rollers 9 and 10, which rotate in the directions shown by the arrows, are spaced apart so as to partly collapse and support the tubular film 4 as it enters the water 6, without actually nipping the film. In operation, the surface of the body of water in tank 5 is maintained at a level such that the axes of rotation of the rollers 9 and 10 lie within the plane of the water surface, or approximately so, having regard to the need to provide adequate support for film 4 as it enters the water. Rollers 9 and 10 are cooled by the water in tank 5. Some distance below rollers 9 and 10 is a pair of nipping rollers 11 by means of which the cooled film is fully collapsed to the "lay-flat" form. The nipping rollers 11 also serve to draw the film downwardly from the extruder and through the water; the film then passes to haul-off equipment (not shown).

In operation of the machinery just described, the inflated film 4 is both rapidly chilled and supported by the chilling rollers 9 and 10 as it enters the cooling water 6, in which it is fully cooled prior to passing through the nipping rollers 11.

By way of example, polypropylene film was manufactured using the machinery just described. The extruder was a 30 millimeter (internal barrel diameter) extruder fitted with an 80 millimeter (diameter) die having an extrusion orifice width of 0.030 inch. The chilling rollers were 6.5 inches in diameter and the nipping rollers comprised a conventional pair of steel and rubber-covered rollers. The polypropylene film was produced under the following operating conditions:

Extruder temperature profile (feed end to die end)—210 to 240° C.
Die tempearture—230° C.
Melt temperature—230° C.
Screw speed—80 revolutions per minute.
Water bath temperature—12° C.
Distance from die to water surface (measured vertically from center line of chilling rollers)—14 inches
Blow-up ratio—1.3:1
Film thickness—100 gauge A film of excellent clarity was obtained, free from surface wrinkles and imperfections due to adherence in the heat-softened state.

By way of comparison the machinery was run under conditions in which the water level in tank 5 was raised so as to just immerse the rollers 9 and 10 so that these rollers no longer fully supported the film 4 as it entered the body of cooling water. Under these condititons it was found that the hydrostatic pressure exerted on the unsupported tubular film 4 caused irregular collapse of the film before it had cooled below its "heat tacky" temperature, and this resulted in unacceptable wrinkling and adhesion in the resulting lay-flat film.

I claim as my invention:

1. In the process for the manufacture of polyolefin film in which an extruded tubular film, internally inflated with a gaseous inflating medium, is drawn downwards from an extruder into a body of cooling liquid within which said tubular film is fully collapsed to "lay-flat" form, the improvement which comprises passing said tubular inflated film between a pair of parallel, spaced-apart, chilling rollers disposed at the surface of said body of cooling liquid for rotation partly immersed thereien in positions such that said chilling rollers support, but do not nip, the film as it enters said body of cooling liquid, whereby said film is incompletely collapsed between said chilling rollers, thereafter passing said film, within said body of cooling liquid, between a pair of nipping rollers whereby said film is fully collapsed, and withdrawing the collapsed film from said cooling liquid.

2. A process as claimed in claim 1, wherein said chilling rollers are disposed with their axes of rotatiton lying substantially within the plane containing the surface of said body of liquid.

3. A process as claimed in claim 1 wherein said cooling liquid is water maintained at a temperature which is at least 50° C. below the softening point of said polyolefin.

4. A process as claimed in claim 1 wherein said polyolefin is polypropylene.

5. Apparatus for the manufacture of polyolefin film which comprises, in combination, an extruder capable of extruding in a downward direction a tubular film of molten polyolefin, means for introducing a gaseous inflating medium internally of the film, and film cooling apparatus comprising a container for cooling liquid, means for drawing said tubular film into a body of liquid in said container, a pair of parallel, spaced-apart chilling rollers adapted to support solely, but not to nip, said tubular film as it enters said body of cooling liquid, and a pair of nipping rolls adapted to fully collapse said tubular film within said body of cooling liquid.

References Cited

UNITED STATES PATENTS 2,337,927  12/1943  Reichel et al. _____ 18—14

ROBERT F. WHITE, Primary Examiner

J. H. SILBAUGH, Assistant Examiner

U.S. Cl. X.R.

18—14; 264—178